(12) United States Patent
Ishikawa et al.

(10) Patent No.: US 8,259,160 B2
(45) Date of Patent: Sep. 4, 2012

(54) METHOD FOR GENERATING FREE VIEWPOINT VIDEO IMAGE IN THREE-DIMENSIONAL MOVEMENT AND RECORDING MEDIUM

(75) Inventors: Akio Ishikawa, Saitama (JP); Shigeyuki Sakazawa, Saitama (JP); Atsushi Koike, Saitama (JP)

(73) Assignee: KDDI Corporation, Tokyo (JP)

( * ) Notice: Subject to any disclaimer, the term of this patent is extended or adjusted under 35 U.S.C. 154(b) by 573 days.

(21) Appl. No.: 12/488,827

(22) Filed: Jun. 22, 2009

(65) Prior Publication Data

US 2010/0026788 A1 Feb. 4, 2010

(30) Foreign Application Priority Data

Jul. 31, 2008 (JP) ................................. 2008-197858

(51) Int. Cl.
*H04N 13/02* (2006.01)
*H04N 5/225* (2006.01)

(52) U.S. Cl. .......................................... 348/48; 348/262

(58) Field of Classification Search .................. 348/169, 348/77, 162, 164, 208, 262, 48, 39; 382/154, 382/153, 152, 103; 345/419, 421, 424, 427
See application file for complete search history.

(56) References Cited

U.S. PATENT DOCUMENTS

| | | | |
|---|---|---|---|
| 2005/0017968 A1* | 1/2005 | Wurmlin et al. | 345/419 |
| 2009/0033740 A1* | 2/2009 | Ishikawa et al. | 348/39 |
| 2009/0046152 A1* | 2/2009 | Aman | 348/157 |
| 2009/0153650 A1* | 6/2009 | Misawa et al. | 348/48 |
| 2011/0211096 A1* | 9/2011 | Aagaard et al. | 348/262 |

FOREIGN PATENT DOCUMENTS

| | | |
|---|---|---|
| JP | 10-111951 A | 4/1998 |
| JP | 2003-163929 A | 6/2003 |
| JP | 2004-258775 A | 9/2004 |
| JP | 2008-015756 A | 1/2008 |
| WO | 2004/114224 A1 | 12/2004 |

OTHER PUBLICATIONS

T. Naemura et al., "3-D visual data compression based on ray-space projection" The University of Tokyo, Department of Information and Communication Engineering, SPIE Visual Commun. and Image Process. vol. 3024, pp. 413-424.
Japanese Office Action dated Feb. 1, 2012, issued in corresponding Japanese Patent Application No. 2008-197858.

\* cited by examiner

*Primary Examiner* — Behrooz Senfi
(74) *Attorney, Agent, or Firm* — Westerman, Hattori, Daniels & Adrian, LLP

(57) ABSTRACT

The present invention provides a method for generating free viewpoint video image in three-dimensional movement capable of synthesizing the free viewpoint video image from a viewpoint which looks down on an object from above. This method includes a process of taking multi-viewpoint video images using a plurality of cameras located on an identical plane and a camera not located on the identical plane, a process of generating video image at a viewpoint having the same azimuth as a desired viewpoint and located on the plane from the multi-viewpoint video images of the cameras on the plane, and a process of generating video image at the desired viewpoint from video image of the camera not located on the plane and video image at the viewpoint having the same azimuth as the desired viewpoint and located on the plane.

8 Claims, 5 Drawing Sheets

METHOD FOR GENERATING FREE VIEWPOINT VIDEO IMAGE IN THREE-DIMENSIONAL MOVEMENT AND RECORDING MEDIUM

The present application is claims priority of Japanese Patent Application Serial No. 2008-197858, filed Jul. 31, 2008, the content of which is hereby incorporated by reference in its entirety.

BACKGROUND OF THE INVENTION

1. Field of the Invention

The present invention relates to a method for generating free viewpoint video image in three-dimensional movement and a recording medium thereof, more particularly to a method in which a plurality of video cameras (hereinafter referred to as cameras) are disposed on an identical horizontal plane such that they surround an object while another camera is disposed at the vertex so as to take pictures of the object with these cameras and generate free viewpoint images in three-dimensional movement and a recording medium for recording a program for the same method.

2. Description of the Related Art

Conventionally, there has been proposed a method in which to generate and display video image at an arbitrary viewpoint position using a group of video images taken at a plurality of the viewpoint positions, data of the actually taken video images is read into a memory and video image at the arbitrary viewpoint position is generated by calculating the brightness value of each pixel, based on a concept of ray space, that each video image data is a set of rays flying in three-dimensional space.

Here, the concept of ray space will be explained. In the three-dimensional space, rays are emitted by a light source and reflected light of an object. A ray traversing a certain position within three-dimensional space is uniquely determined by six variables indicating that position (X, Y, Z), direction (θ, φ) and time t. If a function for indicating the light intensity of this ray is defined as F by paying attention to a certain time t=0 for simplification, data of a ray group in three-dimensional space is expressed as F (X, Y, Z, θ, φ) and the group of rays within the three-dimensional space is described as five-dimensional parameter space. This parameter space and its partial space are called ray space.

First, a case of using a plane recording ray space will be described with reference to FIG. 7.

Now, attention is paid to a group of rays passing a plane called $Z=Z_c$. This plane is called a reference plane and a two-dimensional coordinate system (P, Q) is defined on this reference plane. Here, in this two-dimensional coordinate system (P, Q), with an intersection point thereof with the Z-axis as an origin, the P-axis is set in parallel to the X-axis and the Q-axis is set in parallel to the Y-axis. If a horizontal plane (X-Z plane) perpendicular to the Y-axis is considered and it is assumed that an azimuth difference in the vertical direction is not considered (Y=0, φ=0), a real zone is as shown in FIG. 7. A group of rays emitted from the reference plane is described as F (P, θ) by a position P and an angle θ. Therefore, for a group of rays passing a point $(X_c, Z_c)$ in the real zone, the following relationship is established.

$$P = X_c - Z_c \tan\theta \quad (1)$$

Here, if a variable of "u=tan θ" is defined, the following equation is converted as follows.

$$P = X_c - u Z_c \quad (2)$$

Therefore, on the plane recording ray space, a single ray within the real zone is mapped as a point and its light intensity, namely, color information is recorded there. Further, from the equation (2), it is apparent that a ray group passing a certain point within the real zone is mapped to a straight line on P-u space.

FIG. 8 shows a state in which ray observed at a viewpoint position $(X_c, Z_c)$ within the real zone has been mapped to the P-u space. In the meantime, the P-u space constitutes the partial space of the above-described five-dimensional ray space. The above matters also have been described in Japanese Patent Application Laid-Open Nos. 10-111951 and 2004-258775.

Next, a case of using a cylindrical recording ray space will be described with reference to FIG. 9. Meanwhile, the cylindrical recording ray space has been disclosed in Japanese Patent Application Laid-Open No. 2008-15756, which is a patent application by this assignee.

Now, attention is paid to a ray group propagated at an azimuth of $\theta=\theta_c$ at a certain time t=0. A plane which passes the Y-axis and is perpendicular to the direction of the propagation of this ray group is called a reference plane and a two-dimensional coordinate system (P, Q) is defined on this reference plane. Here, in this two-dimensional coordinate system (P, Q), with an origin of the world coordinate system as an origin position thereof, the Q axis is set in parallel to the Y-axis and the P-axis is set in parallel to both the direction of the propagation of the ray group and the Q-axis. If a horizontal plane (X-Z plane) perpendicular to the Y-axis is considered and it is assumed that no azimuth difference in the vertical direction is taken into account (Y=0, φ=0), the real zone is as shown in FIG. 9. A ray group propagated in a direction perpendicular to the reference plane is described as F (P, θ) with two variables, position P and angle θ. Therefore, the following relationship is established for the ray group passing a certain point $(X_c, Z_c)$ within the real zone.

$$P = X_c \cos\theta - Z_c \sin\theta \quad (3)$$

Therefore, on the cylindrical recording ray space, a single ray within the real zone is mapped as a point and the light intensity, namely, color information is recorded there. From the equation (3), it is apparent that the ray group passing a certain point within the real zone is mapped to a sine curve on the P-θ space.

FIG. 10 shows a state in which ray observed at a viewpoint position $(X_c, Z_c)$ within the real zone has been mapped to the P-θ space. In the meantime, the P-θ space constitutes the partial space of the above-described five-dimensional ray space.

To reconstruct an image at an arbitrary viewpoint position from this ray space at a high precision, originally, a dimension along the Q-axis direction, that is, the dimension in the vertical direction is necessary. However, in that case, the ray space data needs to form at least a four-dimensional space of P-Q-θ-φ, so that the ray space data possesses a very large data quantity. Thus, until now, only the P-θ space (P-u space), which is a partial space of the ray space, has been considered. Further, it is considered very redundant to make the entire coordinates of the ray space possess color information. The reason is that even if only the P-θ space (P-u space) is considered, pixel information in the Q-axis direction is necessary for reconstructing images and therefore the ray space turns to three-dimensions, where the light intensity of each ray needs to be recorded. Then, there is a method in which ray space arithmetic operation is performed for all pixels of the image to be reconstructed so as to obtain the brightness value from a multi-viewpoint image (image taken from a plurality of different viewpoint positions) read into a memory. In the meantime, the ray space arithmetic operation refers to an arithmetic operation to be performed based on the equation (2) and the equation (3) in the P-θ space (P-u space).

According to the above-described conventional example, to generate and display an image at an arbitrary viewpoint position at a real time corresponding to the movement of an operator, high-speed ray space arithmetic operation is needed. To perform the arithmetic operation, an operation of reading pixel data by accessing a multi-viewpoint image at random must be done. That is, a high-speed random access to the multi-viewpoint image is required. Then, the above-mentioned example has adopted a way of reading the P-θ space (P-u space) and the multi-viewpoint image into the memory before the arithmetic operation.

However, an image from a viewpoint which looks down on an object from above could not be synthesized because according to the conventional method, information about azimuth difference in the vertical direction was not obtained.

SUMMARY OF THE INVENTION

An object of the present invention is to provide a method for generating free viewpoint video image in three-dimensional movement, which enables the azimuth difference in the vertical direction to be reproduced without recording information of the azimuth difference in the vertical direction, and a recording medium thereof. Another object of the present invention is to provide a method for generating free viewpoint video image in three-dimensional movement which enables the free viewpoint video image from a viewpoint which looks down on an object from above to be synthesized and a recording medium thereof.

In order to achieve the object, the present invention has a feature in that a method for generating free viewpoint video image in three-dimensional movement, the method generating video image at an arbitrary viewpoint based on multi-viewpoint images taken actually, comprises a process of taking multi-viewpoint video images using a plurality of cameras located on an identical plane and a camera not located on the identical plane, a process of generating video image at a viewpoint having the same azimuth as a desired viewpoint and located on the plane from the multi-viewpoint video images of the cameras on the plane, and a process of generating video image at the desired viewpoint from video image of the camera not located on the plane and video image at the viewpoint having the same azimuth as the desired viewpoint and located on the plane, wherein without recording information of azimuth difference in a direction perpendicular to the plane (vertical direction in a case where the plane is a horizontal plane), the azimuth difference in the same direction is reproducible.

According to the present invention, the free viewpoint video image from a viewpoint which looks down on an object from above can be synthesized based on multi-viewpoint video images by the vertex camera as well as the cameras disposed on the horizontal plane. Further, the azimuth difference in the vertical direction can be reproduced without recording information of the azimuth difference in the vertical direction. That is, the three-dimensional viewpoint movement can be achieved only by adding data by the vertex camera to conventional free viewpoint video image synthesized data.

BRIEF DESCRIPTION OF THE DRAWINGS

FIG. 1 is looked down from right above;

DETAILED DESCRIPTION OF THE PREFERRED EMBODIMENTS

Hereinafter, the present invention will be described in detail with reference to the accompanying drawings. According to the principle of the present invention, based on multi-viewpoint images taken by a plurality of cameras disposed on the horizontal plane plus a camera not located on the horizontal plane, for example, a vertex camera, free viewpoint video image from a viewpoint which looks down on an object from above is generated. In recent years, an opportunity of taking pictures with a TV camera (hereinafter referred to as vertex camera) hung from a ceiling has increased. As above mentioned, by using the camera not located on an identical plane at the same time, the viewpoint can be moved three-dimensionally.

Figure 1:
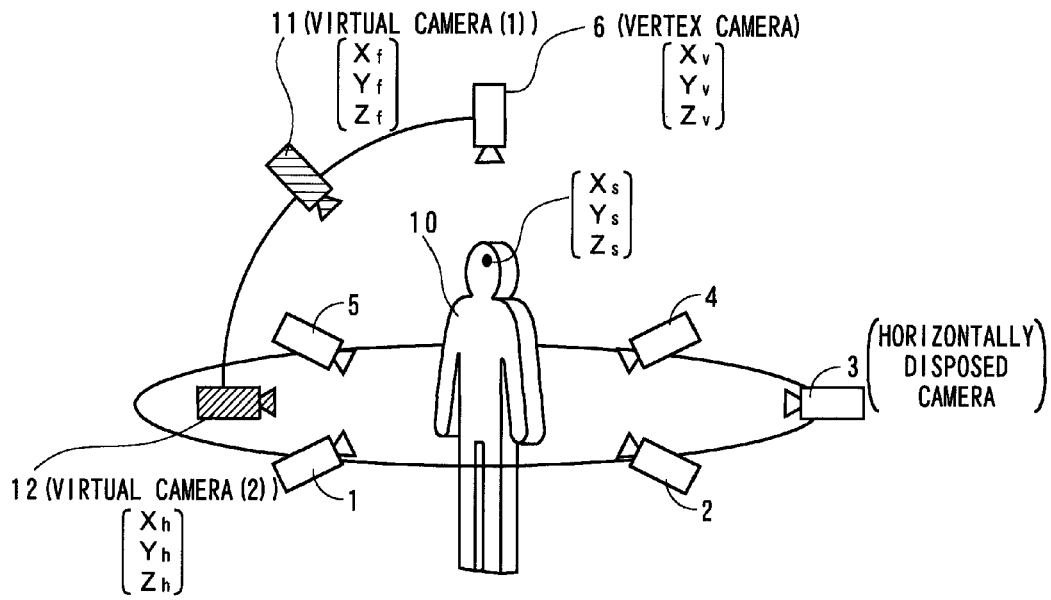
FIG. 1 is an explanatory view showing a schematic structure of the present invention.

FIG. 1 is a schematic explanatory diagram of the above-mentioned principle of the present invention. FIG. 1 shows an example of taking pictures of an object 10 such that it is surrounded with a plurality of horizontally disposed cameras 1, 2, 3, 4, 5 and a vertex camera 6. According to the present invention, to obtain a free viewpoint image (look-down image) from a virtual camera (1) 11, which is a desired viewpoint, a free viewpoint image from a viewpoint on the horizontal plane having the same azimuth as the virtual camera (1) 11, that is, the viewpoint of a virtual camera (2) 12 is generated using images from the horizontally disposed cameras 1, 2, 3, 4, and 5, by a conventional method. Then, the free viewpoint image and images taken with the vertex camera 6 are linearly interpolated, for example, to aim at obtaining the free viewpoint image (look-down image) from the virtual camera (1) 11 located within a plane including the virtual camera (2) 12 and the vertex camera 6.

Figure 2:
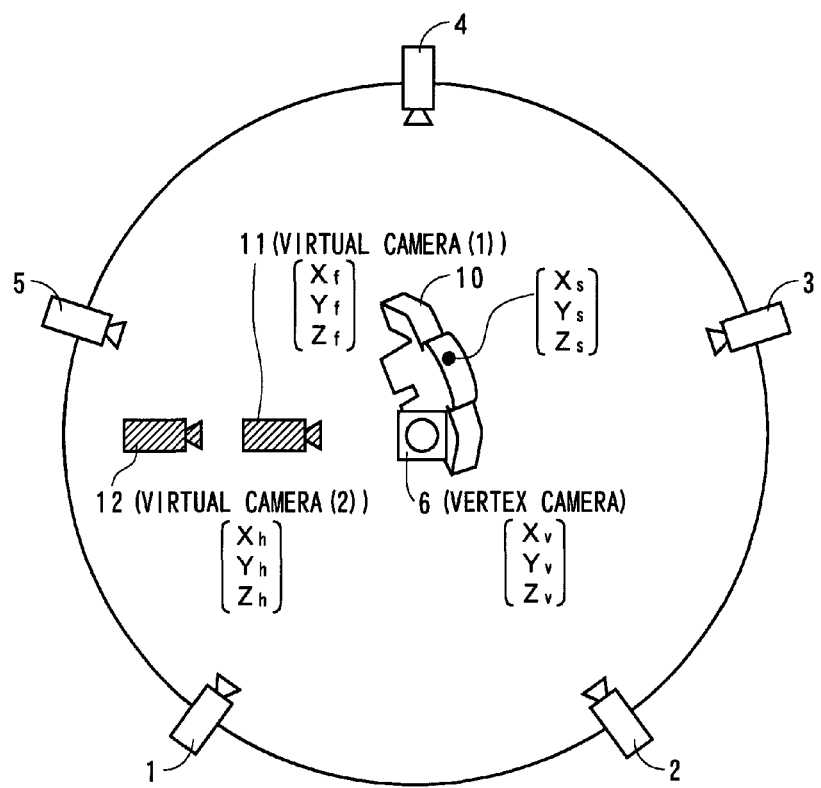
FIG. 2 is an explanatory view of a case where

Hereinafter, an embodiment of the present invention will be described in detail. FIG. 1 is a view of the object 10 and the cameras 1 to 6 disposed around and above the same object 10 and FIG. 2 is a view of FIG. 1 as viewed from right above. Although FIGS. 1 and 2 show a case where pictures are taken with the plurality of the horizontally disposed cameras and the single vertex camera which surround the object in order to simplify the description thereof, the present invention is not restricted to this example.

Now, attention is paid to a single point $(X_s, Y_s, Z_s)$ on the object 10. It is assumed that the position of the desired viewpoint (virtual camera (1) 11) is $(X_f, Y_f, Z_f)$, the azimuth is $\Theta_f$, the elevation angle is $\Phi_f$, the position of the virtual camera (2) 12 corresponding to the virtual camera (1) 11 is $(X_h, Y_h, Z_h)$ and the position of the vertex camera 6 is $(X_v, Y_v, Z_v)$.

According to this embodiment, a free viewpoint video image (image taken by the virtual camera (2) 12) from the viewpoint of the position $(X_h, 0, Z_h)$ at azimuth $\Theta_f$ is synthesized using the conventional method (for example, ray space method) from the multi-viewpoint images by the cameras disposed horizontally. At this time, a depth value of each of pixels constituting the free viewpoint video image is calculated preliminarily.

Figure 3:
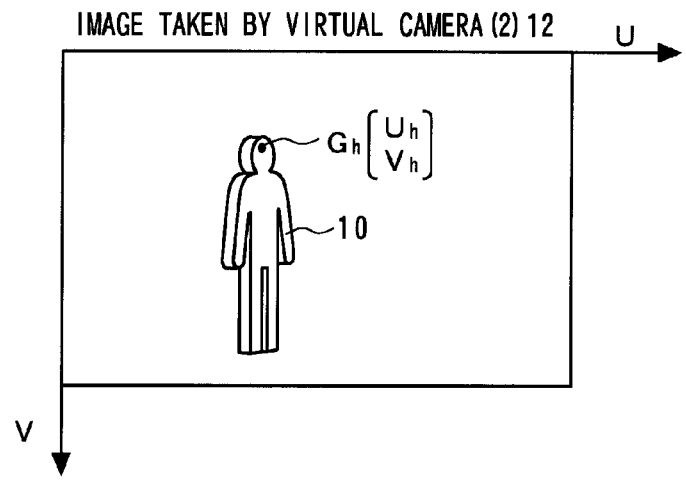
FIG. 3 is an explanatory diagram of an image taken by a virtual camera (2)

On the other hand, which pixel of the image taken by the virtual camera (2) 12 the point $(X_s, Y_s, Z_s)$ on the object surface corresponds to is obtained using projection conversion of an equation (4) below, as shown in FIG. 3. Here, $(U_h, V_h)$ is a pixel coordinate of the image taken by the virtual camera (2) 12 and $P_h$ is a projection matrix of the virtual camera (2) 12.

$$s_h(U_h, V_h, 1)^T = P_h(X_s, Y_s, Z_s, 1)^T \quad (4)$$

Figure 4:
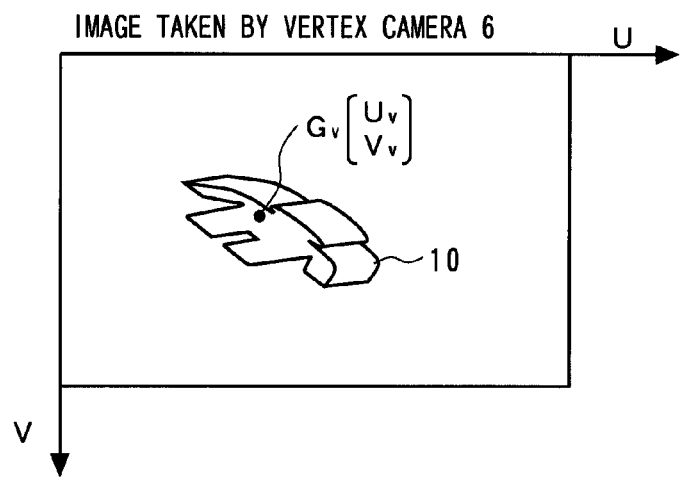
FIG. 4 is an explanatory diagram of an image taken by the vertex camera.

Further, which pixel of the image taken by the vertex camera 6 the point $(X_s, Y_s, Z_s)$ on the object surface corresponds to is obtained using the projection conversion of an equation (5) below, as shown in FIG. 4. Here, $(U_v, V_v)$ is a pixel coordinate of the image taken by the vertex camera 6 and $P_v$ is projection matrix of the vertex camera 6.

$$s_v(U_v, V_v, 1)^T = P_v(X_s, Y_s, Z_s, 1)^T \quad (5)$$

Figure 5:
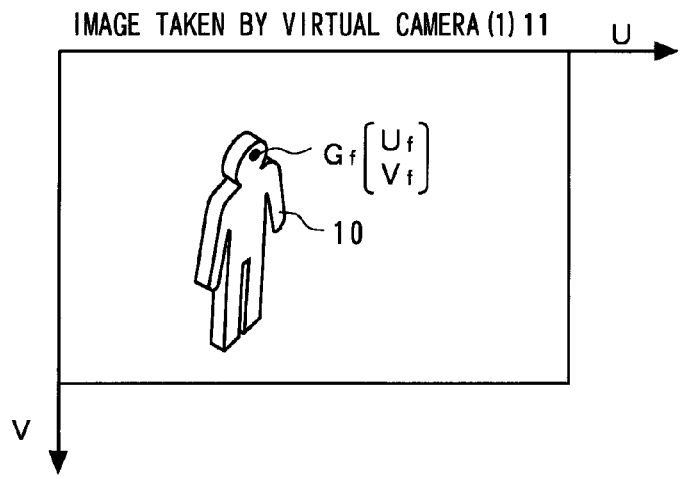
FIG. 5 is an explanatory diagram of an image taken by a virtual camera (1)

Further, which pixel of the image taken by the desired viewpoint the point $(X_s, Y_s, Z_s)$ on the object surface corresponds to is obtained using the projection conversion of an equation (6) below, as shown in FIG. 5. Here, $(U_f, V_f)$ is a pixel coordinate of the image taken by the virtual camera (1) 11 and $P_f$ is projection matrix of the virtual camera (1) 11.

$$s_f(U_f, V_f, 1)^T = P_f(X_s, Y_s, Z_s, 1)^T \quad (6)$$

Then, a pixel value $G_v$ of $(U_v, V_v)$ of the vertex camera 6 corresponding to the pixel coordinates $(U_f, V_f)$ of an image taken by the virtual camera (1) 11 and a pixel value $G_h$ of $(U_h, V_h)$ of the virtual camera (2)12 corresponding to the aforementioned pixel coordinates $(U_f, V_f)$ are interpolated and its result is assigned to the pixel value $G_f$ of the aforementioned pixel coordinates $(U_f, V_f)$, in order to obtain an image from the desired viewpoint.

That is, the pixel value $G_f$ of the virtual camera (1)11 can be calculated by performing linear interpolation corresponding to the elevation angles of the virtual viewpoint (2)12 and the vertex camera 6 (assumed as $\Phi_h$ and $\Phi_v$) based on an equation (7) below. This linear interpolation can be performed by use of, for example, ray space.

$$G_f = (\Phi_v G_h + \Phi_h G_v)/(\Phi_h + \Phi_v) \quad (7)$$

The method for obtaining the pixel value $G_f$ of the virtual camera (1)11 by paying attention to the single point $(X_s, Y_s, Z_s)$ on the object 10 has been described above. It is apparent that an image of the object as viewed from the virtual camera (1)11 can be obtained by obtaining the pixel value $G_f$ of the virtual camera (1)11 about all points on the object 10 in the same manner as above. Although the above embodiment has been described with reference to the vertex camera, the present invention is not restricted to the vertex camera, however it is permissible to use any camera not located on the plane and located at other position than the vertex.

Incidentally, as the aforementioned ray space, plane recording ray space, cylindrical recording ray space, spherical recording ray space or local area division type ray space may be used.

Figure 6:
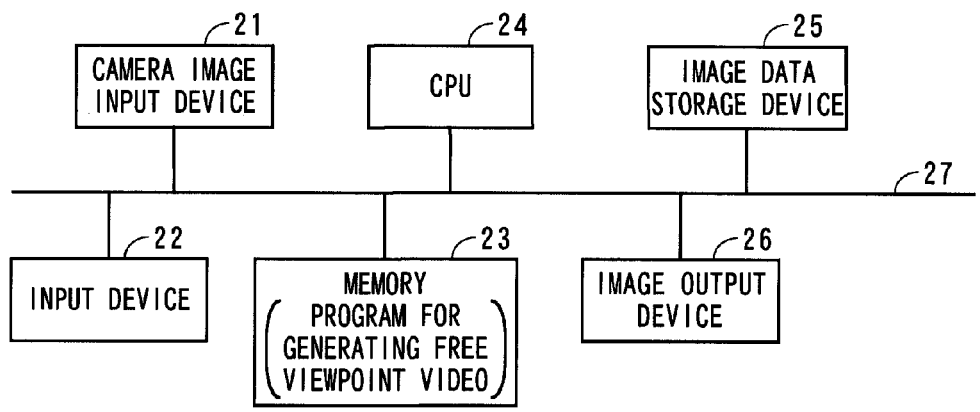
FIG. 6 is a block diagram of a system example for achieving a method for generating free viewpoint video image in three-dimensional movement of the present invention.
Figure 7:
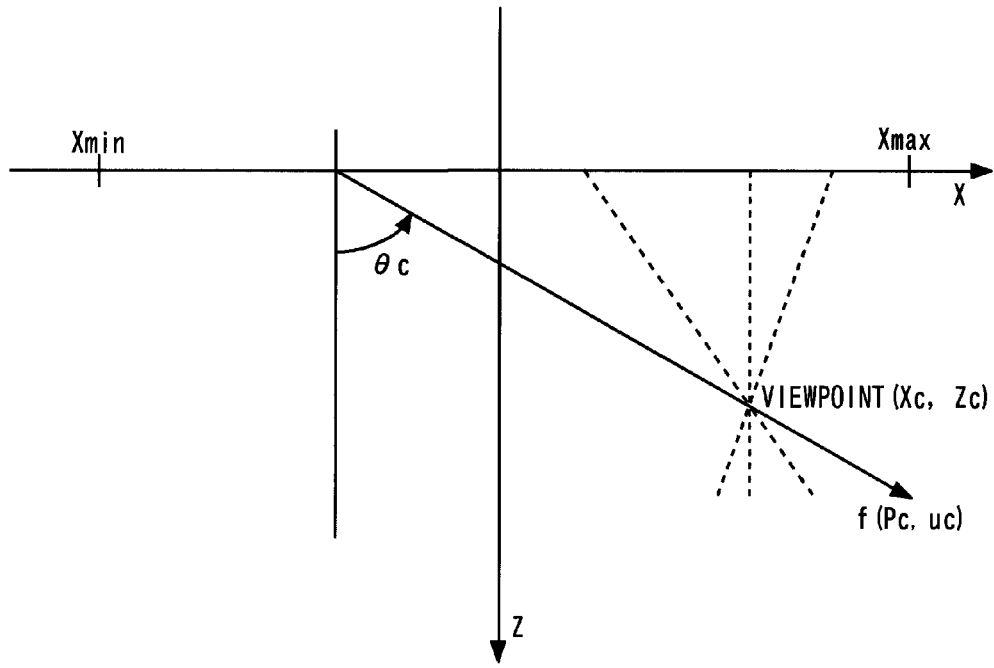
FIG. 7 is an explanatory diagram of a plane recording ray space.
Figure 8:
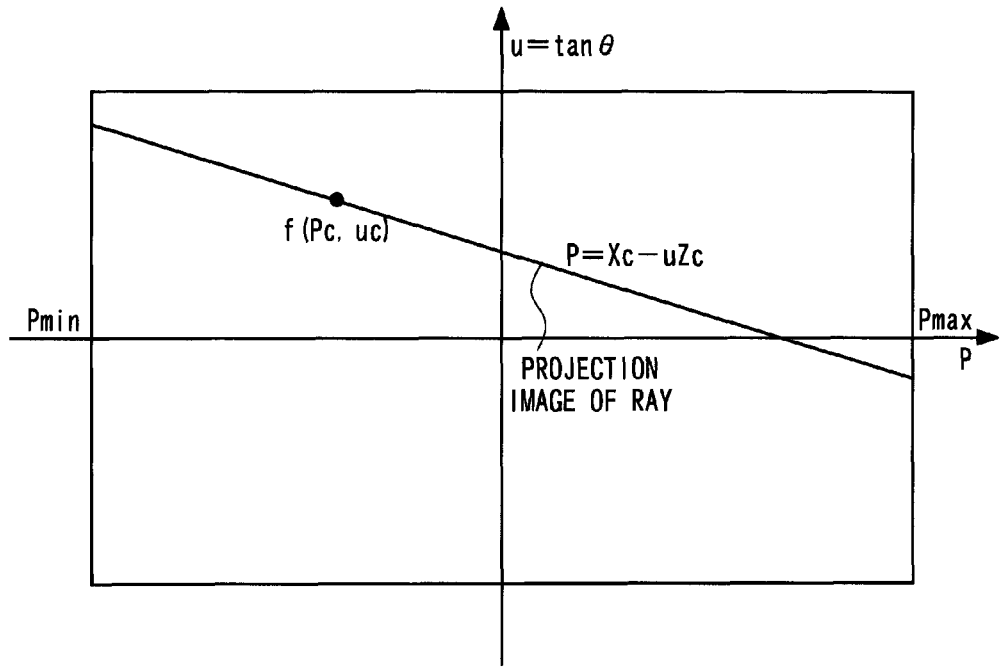
FIG. 8 is a diagram showing a state in which ray observed at a viewpoint position $(X_c, Z_c)$ within the real zone is mapped to the P-u space.
Figure 9:
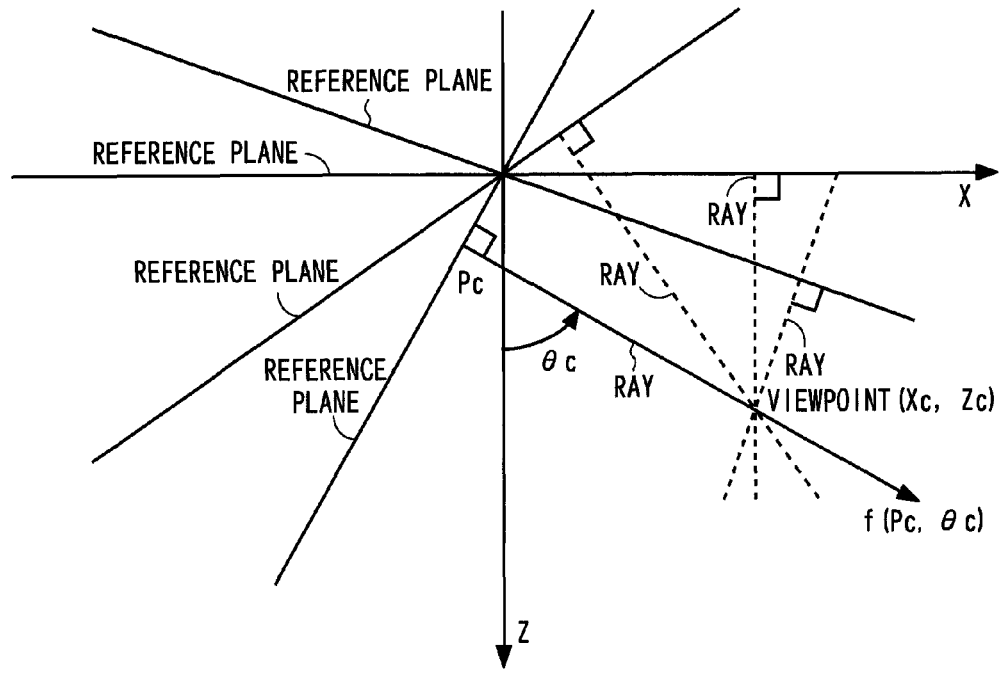
FIG. 9 is an explanatory diagram of a cylindrical recording ray space.
Figure 10:
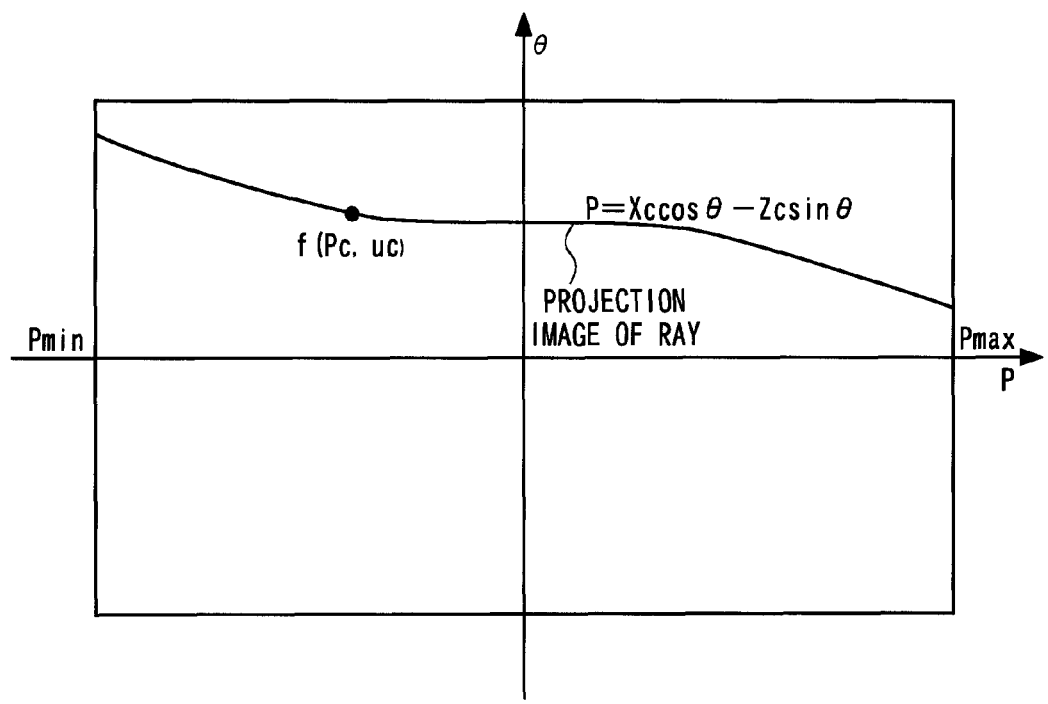
FIG. 10 is a diagram showing a state in which ray observed at a viewpoint position $(X_c, Z_c)$ within the real zone is mapped to the P-θ space.

Next, an outline of the system configuration for achieving the method for generating free viewpoint video image in three-dimensional movement according to the present invention will be described with reference to FIG. 6. This system includes a camera image input device 21 for inputting images from the plurality of the cameras 1 to 5 and the vertex camera 6, an input device 22 such as a keyboard and a mouse for inputting camera internal parameters of the camera and a plurality of position data of the real zone, a memory 23 (such as ROM and hard disk) which stores the program for generating free viewpoint video data in the three dimensional movement, which is a major component of the present invention, a CPU 24 which executes a processing procedure based on the program stored in the memory 23, an image data storage device 25 for storing free viewpoint video image in three-dimensional movement, an image output device 26 which is a display device (such as CRT, liquid crystal display) and a bus 27 for connecting the above-mentioned components. In the meantime, the program for generating free viewpoint video image in three-dimensional movement may be stored in an external memory device such as a CD-ROM and by setting the external memory device in a data reading device (not shown) upon execution of a processing, it may be supplied to the CPU 24 or the like.

The program for generating the free viewpoint video image in three-dimensional movement includes a process of taking multi-viewpoint video images using a plurality of cameras located on an identical plane and a camera not located on the identical plane; a process of generating video image at a viewpoint having the same azimuth as the desired viewpoint and located on the aforementioned plane from the multi-viewpoint video images of the cameras on the aforementioned plane; and a process of generating video image at the desired viewpoint using a video image from the camera not located on the aforementioned plane and a video image at the viewpoint having the same azimuth as the desired viewpoint and located on the aforementioned plane.

Further, another program for generating free viewpoint video image in three-dimensional movement includes a process of taking multi-viewpoint video images using a plurality of cameras located on an identical plane and a camera not located on the identical plane; a process of generating video image at a viewpoint having the same azimuth as the desired viewpoint and located on the aforementioned plane from the multi-viewpoint video images taken by the cameras on the aforementioned plane by using ray space; and a process of generating video image at the desired viewpoint from a video image taken by the camera not located on the aforementioned plane and a video image at the viewpoint having the same azimuth as the aforementioned desired viewpoint and located on the aforementioned plane by using ray space.

What is claimed is:

1. A method for generating free viewpoint video image in three-dimensional movement, comprising the steps of:

taking multi-viewpoint video images using a plurality of cameras located on an identical plane and a video image using a camera not located on the plane;

generating, using a processor, a first video image $G_h$ at a viewpoint at an elevation angle $\Phi_h$ located on the plane, having an azimuth the same as an azimuth of a desired viewpoint not on the plane, from the multi-viewpoint video images of the cameras on the plane; and generating, using the processor, a second video image $G_f$ at the desired viewpoint from the video image $G_v$ of the camera at an elevation angle $\Phi_v$ not located on the plane and the first video image $G_h$, by using an equation $G_f = (\Phi_v G_h + \Phi_h G_v)/(\Phi_h + \Phi_v)$.

2. A method for generating free viewpoint video image in three-dimensional movement, comprising the steps of:
- taking multi-viewpoint video images using a plurality of cameras located on an identical plane and a video image using a camera not located on the identical plane;
- generating, using a processor, a first video image $G_h$ at a viewpoint at an elevation angle $\Phi_h$ located on the plane, having an azimuth the same as an azimuth of a desired viewpoint not on the plane, from multi-viewpoint video images of the cameras on the plane by use of ray space; and
- generating, using the processor, a second video image at the desired viewpoint from the video image $G_v$ of the camera at an elevation angle $\Phi_v$ not located on the plane and the first video image $G_h$ by using the ray space and an equation $G_f=(\Phi_v G_h+\Phi_h G_v)/(\Phi_h+\Phi_v)$.

3. The method for generating free viewpoint video image in three-dimensional movement according to claim 2, wherein plane recording ray space is used as the ray space.

4. The method for generating free viewpoint video image in three-dimensional movement according to claim 2, wherein cylindrical recording ray space or spherical recording ray space is used as the ray space.

5. The method for generating free viewpoint video image in three-dimensional movement according to claim 4, wherein local area division type ray space is used as the ray space.

6. The method for generating free viewpoint video image in three-dimensional movement according to claim 5, further comprising the step of, in the local area, moving a position of a viewpoint image in the local area within the free viewpoint video image to be synthesized according to a position of a viewpoint or a processing of moving a position of ray information to be read according to the position of the viewpoint.

7. A non-transient computer readable recording medium recording a program that causes a plurality of cameras on an identical plane to take multi-viewpoint video images, a camera not located on the plane to take a video image, and a processor to generate a first video image $G_h$ at a viewpoint at an elevation angle $\Phi_h$ located on the plane having an azimuth the same as an azimuth of a desired viewpoint not on the plane, from the multi-viewpoint video images of the cameras on the plane and to generate a second video image $G_f$ at the desired viewpoint from the video image $G_v$ of the camera at an elevation angle $\Phi_v$ not located on the plane and the first video image $G_h$ by using an equation $G_f=(\Phi_v G_h+\Phi_h G_v)/(\Phi_h+\Phi_v)$.

8. A non-transient computer readable recording medium recording a program that causes a plurality of cameras on an identical plane to take multi-viewpoint video images, a camera not located on the plane to take a video image, and a processor to generate a first video image $G_h$ at a viewpoint at an elevation angle $\Phi_h$ located on the plane, having an azimuth the same as an azimuth of a desired viewpoint not on the plane, from the multi-viewpoint video images of the cameras on the plane by use of ray space, and to generate a second video image $G_f$ at the desired viewpoint from the video image $G_v$ of the camera at an elevation angle $\Phi_v$ not located on the plane and the first video image $G_h$ by use of ray space and using an equation $G_f=(\Phi_v G_h+\Phi_h G_v)/(\Phi_h+\Phi_v)$.

* * * * *